United States Patent
Bell

(10) Patent No.: US 7,477,729 B2
(45) Date of Patent: *Jan. 13, 2009

(54) PORTABLE MESSAGE WAITING INDICATOR

(75) Inventor: Ian Andrew Bell, Burnaby (CA)

(73) Assignee: AOL LLC, Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/553,660

(22) Filed: Oct. 27, 2006

(65) Prior Publication Data

US 2007/0121809 A1     May 31, 2007

Related U.S. Application Data

(63) Continuation of application No. 09/759,116, filed on Jan. 11, 2001, now Pat. No. 7,130,388.

(51) Int. Cl.
*H04M 1/64* (2006.01)

(52) U.S. Cl. .................. 379/88.12; 379/88.25; 370/352; 455/63.1; 455/455; 455/516

(58) Field of Classification Search .............. 379/88.12, 379/88.25; 370/352; 455/63.1, 455, 516
See application file for complete search history.

(56) References Cited

U.S. PATENT DOCUMENTS

| | | | |
|---|---|---|---|
| 5,363,431 A | 11/1994 | Schull et al. | |
| 5,588,038 A | 12/1996 | Snyder | |
| 5,838,226 A | 11/1998 | Houggy et al. | |
| 5,918,158 A | 6/1999 | LaPorta et al. | |
| 5,939,699 A | 8/1999 | Perttunen et al. | |
| 5,987,317 A | 11/1999 | Venturini | |
| 6,014,559 A | 1/2000 | Amin | |
| 6,192,251 B1 | 2/2001 | Jyogataki | |
| 6,201,858 B1 | 3/2001 | Sundhar | |
| 6,313,733 B1 | 11/2001 | Kyte | |
| 6,317,485 B1 | 11/2001 | Homan et al. | |
| 6,389,115 B1 | 5/2002 | Swistock | |
| 6,418,305 B1 | 7/2002 | Neustein | |
| 6,418,307 B1 | 7/2002 | Amin | |
| 6,556,666 B1 | 4/2003 | Beyda et al. | |
| 6,560,318 B1 | 5/2003 | Spielman et al. | |
| 6,574,470 B1 | 6/2003 | Chow et al. | |

*Primary Examiner*—Gerald Gauthier
(74) *Attorney, Agent, or Firm*—Michael A. Glenn; Glenn Patent Group

(57) ABSTRACT

An apparatus and method are provided for easily indicating to a user that a communication has been received for him or her. A portable message waiting indication device (MWID) includes a power source (e.g., battery), signal receiver and a visual and/or audible indicator. The indicator is activated in response to receipt of a first wireless signal at the receiver. In response to a second signal the indicator is deactivated. A MWID may also include a user-actuable switch or sensor to deactivate the indicator. In one method of using a MWID to inform a user that a communication has been received, the user registers the MWID and may identify when the MWID indicator should be activated (e.g., for certain types of messages (e.g., voice-mail, electronic mail), certain senders, a category of senders, time of day, message priority). Multiple MWIDs may be configured and employed by a user, and each may be configured similarly or differently.

17 Claims, 3 Drawing Sheets

PORTABLE MESSAGE WAITING INDICATOR

CROSS REFERENCE TO RELATED APPLICATIONS

This application is a Continuation patent application of U.S. patent application Ser. No. 09/759,116, filed Jan. 11, 2001, now U.S. Pat. No. 7,130,388, entitled Portable Message Waiting Indicator, which application is incorporated herein in its entirety by this reference made thereto.

BACKGROUND

This invention relates to the field of communications. More particularly, an apparatus and methods are provided for indicating the receipt of a communication.

Various devices and methods have been introduced for the purpose of notifying a person that a telephonic message has been received for him or her. Answering machines, for example, typically indicate the receipt of a message by flashing a light and/or displaying the number of messages.

The advent of network-based voice-mail service has made it somewhat more difficult to provide an easy, simple and fast way to notify a person that he or she has received a message. With network-based voice-mail service, the person's messages are stored in a remote location operated by the provider of the voice-mail service (e.g., the person's local telephone company). Unlike with an answering machine, with network-based voice-mail service there are no means of quickly (e.g., visually) alerting a person to the receipt of a message. Typically the person must take his or her telephone off-hook to test for a stutter-tone that indicates receipt of a message.

This requires proactive effort by a person, in contrast to simply looking at a visual indicator, is not as easy, and may not be possible at all times. In particular, because the person must physically access a telephone he or she cannot test for stutter-tone when traveling or otherwise away from the telephone.

Another problem with many existing systems for indicating message-waiting status is that they do not function if a person's telephone line is in use. A person cannot test his telephone line for stutter-tone while using it to talk to someone, access the Internet, etc.

Further, stutter-tone is line-specific in that from one telephone a person can only check for messages waiting in a voice-mail system for that telephone line. While at work, a person cannot check for messages received by her residential telephone service, and vice versa.

Many message waiting indication systems are thus dependent upon or tied to calls to or from a particular telephone line, place (e.g., residence, office) and/or device (e.g., a specific telephone). As a result, indicating receipt of a message for a user of a central (e.g., network-based) voice-mail service generally requires the user to adopt new behavior and/or pay extra money for specialized notification services or systems.

Even the user of pager notifications to alert someone that he or she has received a voice-mail message has disadvantages. For example, a paging system may require manual deactivation, in that the person may be required to take some action (e.g., save or delete the message) in order to avoid being paged multiple times for a single message. Further, in order for a pager to inform a person of messages on more than one telephone line or at multiple locations, the pager or pager service must be configured separately for each line or location.

Therefore, what is needed is an apparatus and method of notifying someone of the receipt of a voice-mail message for him or her. The apparatus should be portable, easy to use and should not be limited to use at just one location or with just one telephone or telephone line. The apparatus should be configurable in as few steps (e.g., one) as possible, and it may be desirable for the apparatus to be automatically deactivated when a message is retrieved.

SUMMARY

In one embodiment of the invention an apparatus and methods are provided for notifying a person that he or she has received a communication, regardless of whether the person is using his or her telephone line. In this embodiment the device is designed for simple operation to readily indicate a message-waiting status, and provides independence from any particular place or telephone line. In addition, multiple devices may be employed to indicate message-waiting status for one line or one device may be used to indicate message-waiting status for multiple lines.

In a present embodiment a user employs a message waiting indication device (MWID) to determine when he or she has received a communication (e.g., a telephone call, an electronic mail message, a facsimile). In this embodiment a MWID includes a power source (e.g., a battery), a receiver for receiving notification of a communication and an indicator such as an LED (Light Emitting Diode) or audible alarm. When a communication is received for the user, a first signal is sent to the MWID and the indicator is activated. Receipt of a second signal may turn the indicator off. The small size, light weight, unobtrusive nature and low power requirements of the device make it portable and easy to keep with a person when a larger device (e.g., a telephone) would be awkward.

In another embodiment of the invention a MWID may include means (e.g., a button or pad) for turning the indicator off.

In one method of using a MWID, a user registers the device with his or her voice-mail service or other organization charged with providing him or her with notification of communications. In this method a MWID is assigned a unique code (e.g., serial number), which may be stamped or printed on the device. The user may register more than one device for a specific telephone line (e.g., home or office), electronic mail account, purpose (e.g., indicate receipt of a telephone call, electronic mail message, facsimile) or one device for multiple telephone lines, purposes, etc. A user's message waiting indication service may be configured to indicate receipt of a communication from all sources (e.g., all telephone calls), a specific source (e.g., an electronic mail message from a specific sender) or from multiple sources (e.g., all calls received from a specific area code).

When a user receives a communication meeting the criteria for which a MWID is configured, a signal is sent to the MWID and its indicator is activated. The user may deactivate the indicator manually if the MWID is so designed, and/or a second signal may be sent to the MWID to deactivate it when the user accesses retrieves the communication. In one embodiment of the invention an "empty" or "true" signal is sent to a MWID to activate its indicator, while a "not empty" or "false" signal is sent to deactivate it.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The program environment in which a present embodiment of the invention is executed may incorporate a general-purpose computer or a special purpose device such as a hand-held computer. Details of such devices (e.g., processor, memory, data storage, display) are omitted for the sake of clarity.

It should also be understood that the techniques of the present invention might be implemented using a variety of technologies. For example, methods described herein may be implemented in software executing on a computer system, or implemented in hardware utilizing either a combination of microprocessors or other specially designed application specific integrated circuits, programmable logic devices, or various combinations thereof. In particular, a method described herein may be implemented by a series of computer-executable instructions residing on a storage medium such as a carrier wave, disk drive, or computer-readable medium. Exemplary forms of carrier waves may take the form of electrical, electromagnetic or optical signals conveying digital data streams along a local network or a publicly accessible network such as the Internet.

In one embodiment of the invention a message-indicating device or message waiting indication device (MWID) is provided to indicate to a user that he or she has received a communication. The communication may be a voice-mail message, an electronic mail message, or any other type of communication. In this embodiment the MWID is small, lightweight, unobtrusive and simple to use. It includes an indicator that, when activated (e.g., by a wireless paging signal), informs the user of the communication. The indicator may provide a visual and/or an audible alert, and may be an LED (Light Emitting Diode) or other suitable element.

The MWID also includes a power source (e.g., a battery), which may or may not be replaceable. Therefore, a MWID may be disposable. A MWID may include a user-operable switch, button or sensor to deactivate the indicator. The indicator may also, however, be deactivated in response to receipt of a second signal that is different from the signal that activates the indicator. Thus, after the user accesses or acknowledges receipt of the communication, the second signal may be sent to deactivate the indicator.

Figure 1:
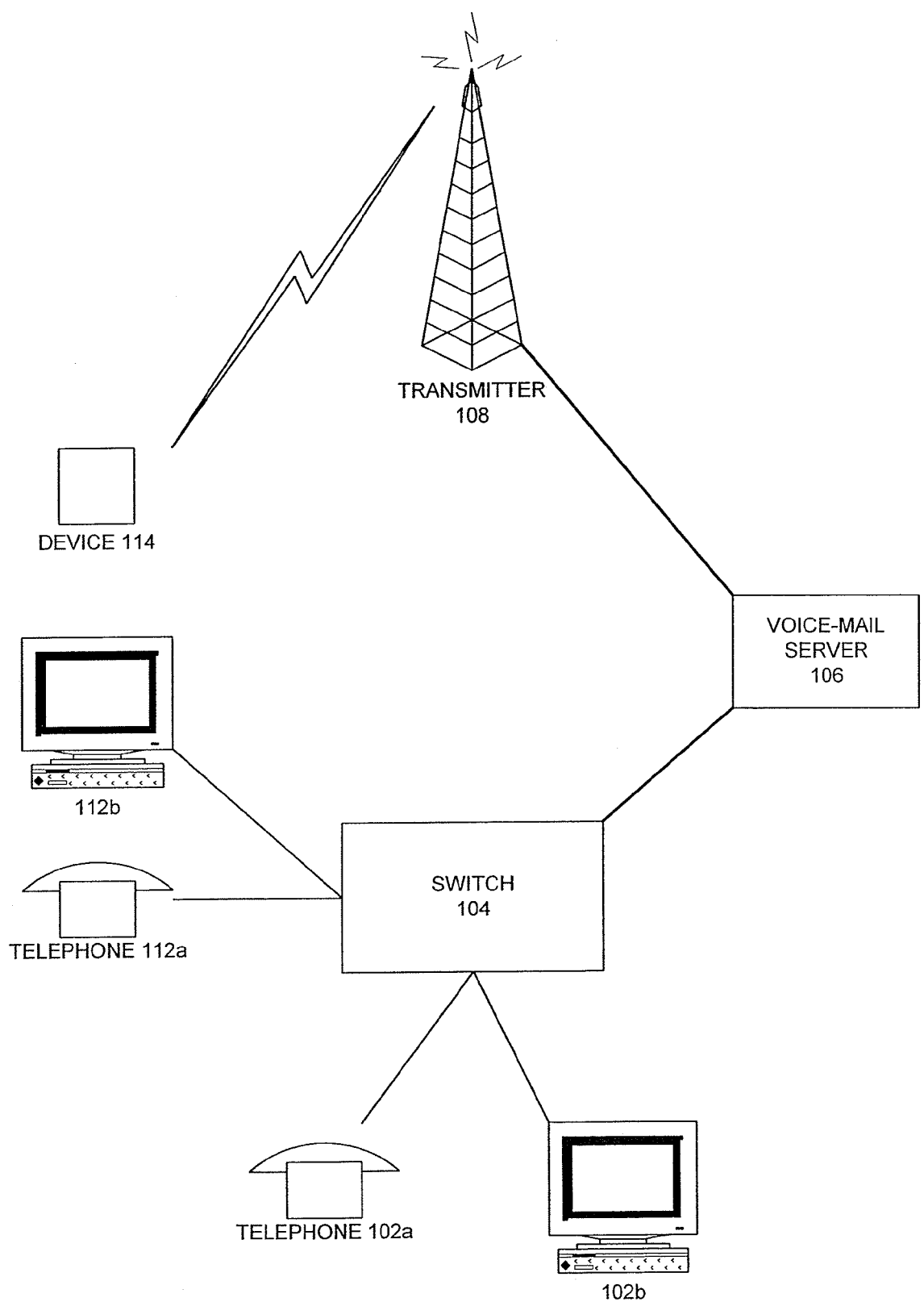
FIG. 1 is a block diagram depicting a system for indicating to a user the receipt of a communication in accordance with an embodiment of the present invention.

FIG. 1 depicts one system in which a MWID may be employed to notify a user of a voice-mail message, according to one embodiment of the invention. In FIG. 1, a telephone call is initiated to a user from one of communication devices 102a, 102b. Telephone 102a may be wired or wireless telephone, and computer 102b may be a desktop, laptop, handheld or other type of computer. Although the system of FIG. 1 is described in the context of a voice-mail message, in other embodiments of the invention different types of communications (e.g., electronic mail, facsimile) and communication devices may be employed.

The telephone call is routed through switch (e.g., a telephone company's central office, an Internet service provider) or gateway 104 to telephone 112a or computer 112b, which are associated with the user. In this example, however, the user is unavailable at the time of the call. He or she may already be using one of the devices for another purpose, may be away or may be otherwise occupied.

Therefore, the call is forwarded or rerouted to voice-mail server 106, which may be part of a central or network voice-mail system. At voice-mail server 106 the caller leaves a voice-mail message, which may be recorded in his or her own voice or may be computer generated (e.g., through computer 102b).

Voice-mail server 106, or a system comprising server 106, then issues a first signal (e.g., a paging signal) to the user's MWID 114. The signal may be sent through transmitter 108 or whatever other signal generation and distribution system is available or appropriate (e.g., wired, satellite). Upon receipt of the signal, the MWID activates an indicator to alert the user that a communication has been received.

In this embodiment of the invention the first signal may be an "empty" paging signal. In other words it may comprise a header but no body. Alternatively, it may include a very short body (e.g., a single character or digit). When the user retrieves, accesses or otherwise acknowledges the communication (e.g., by playing back the voice-mail message), a second signal may be sent to MWID 114. When the second signal is received, the indicator is deactivated. Illustratively, such a second signal is different from the first signal that activated the MWID indicator. Thus, if the first signal is an empty page, the second signal may be a page with a short body (e.g., one character or digit).

In one embodiment of the invention MWID 114 may include a user-operable switch to deactivate the indicator.

Figure 2:
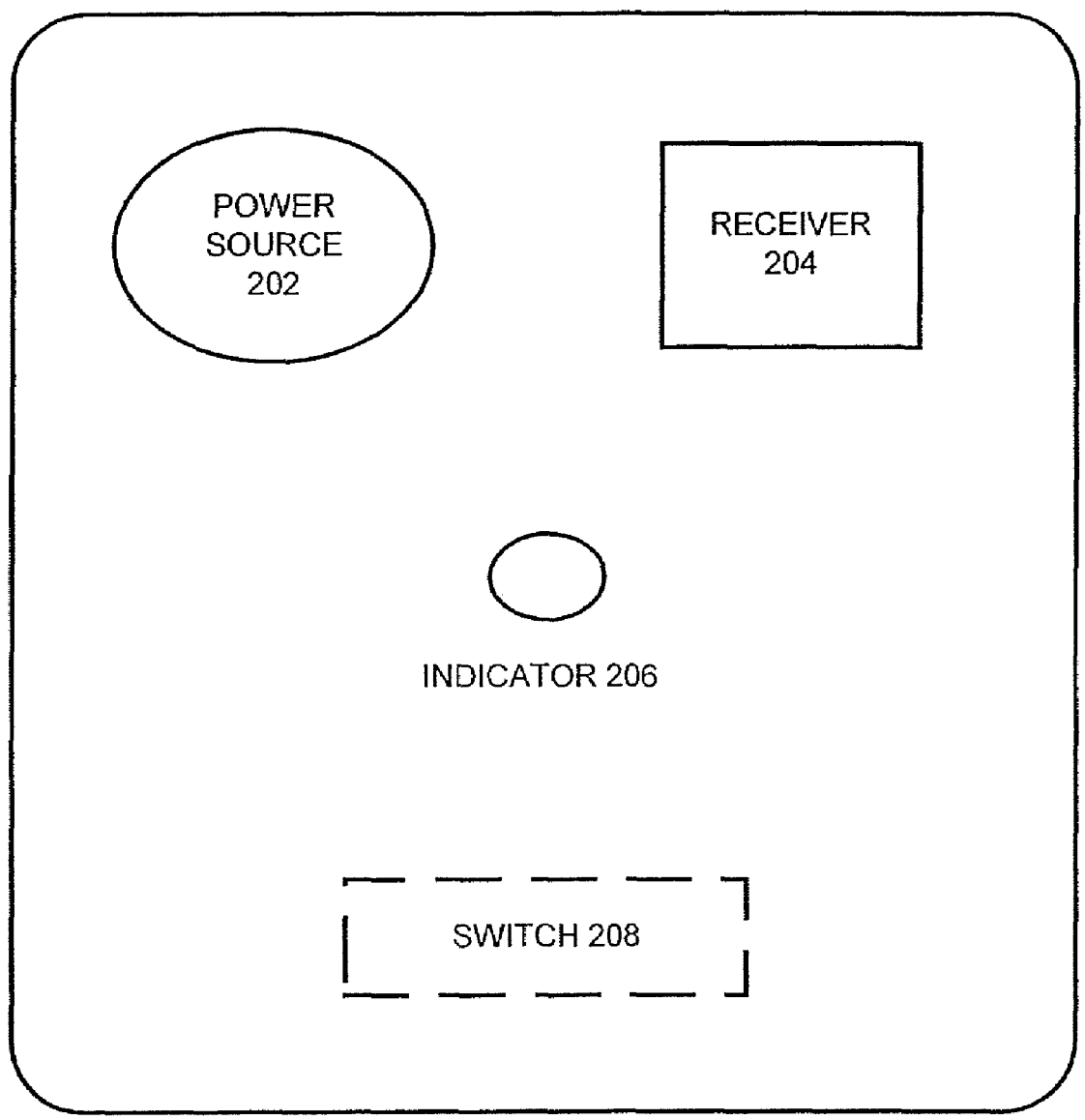
FIG. 2 is a block diagram illustrating a message-waiting indicator in accordance with an embodiment of the invention.

FIG. 2 is a block diagram of a MWID according to a present embodiment of the invention. MWID 200 of FIG. 2 includes power source 202, receiver 204, indicator 206 and, optionally, switch 208. MWID 200 exhibits the shape of a rounded square, but the configuration of a message waiting indication device is not limited to that of MWID 200. In other embodiments of the invention a MWID may assume many different shapes and configurations. In particular, a MWID may be shaped to attach to, appear similar to, or include another object (e.g., a key, a writing implement, a fob).

Power source 202 may be any of various types (e.g., nickel-metal hydride, lithium-ion), sizes and specifications. It is estimated that approximately three volts is sufficient to operate a MWID configured as shown in FIG. 2. As a battery, power source 202 may or may not be replaceable. Also, although not shown in FIG. 2, MWID 200 may include a socket or slot to hold a spare battery. In one alternative embodiment of the invention power source 202 may be a photovoltaic power cell capable of converting light or solar power to electricity to operate the MWID.

Receiver 204 is configured to receive radio (e.g., wireless) signals, as described in conjunction with FIG. 1, to activate and deactivate indicator 206.

Indicator 206 may provide a visual, audible and/or vibratory alert when receiver 204 receives an appropriate signal. Thus, indicator 206 may comprise an LED, LCD (Liquid Crystal Diode), speaker or other such element. Indicator 206 may be capable of one or more alert types. For example, a user may configure a MWID (e.g., through a registration process as described below) so that its indicator flashes with one interval or pattern in one situation and a different interval or pattern in a second situation. Thus, the number of consecutive flashes may indicate a number of communications, a communication priority, a telephone line on which a voice-mail message was left, a type of communication (e.g., voice-mail, electronic mail), etc.

In one alternative embodiment of the invention, multiple indicators may be included on a MWID to indicate receipt of different types of communications, receipt of a message at a different location (e.g., residence, office, mobile telephone), different priorities of messages, etc.

Switch 208, if included in a MWID, allows a user to manually deactivate indicator 206 after it is activated. In one embodiment of the invention indicator 206 may incorporate switch 208. Thus, a user may wish to deactivate the indicator after it alerts him or her to a communication, without having to first access the communication. As described above, a specific signal may be sent to a user's MWID to deactivate its indicator after the user accesses his waiting communication(s).

In an embodiment of the invention in which the device adopts the rounded square shape of FIG. 2, the dimensions of MWID 200 may be approximately 0.5" long by 0.5" wide by 0.3" thick. Further, the MWID may include a hole or other means of attaching to a key chain or other organizer. Yet further, the MWID may have a serial number or other identification code printed on it.

The portable nature of the device makes it very easy to use without being obtrusive, and it can even be disposable. A MWID may include a hole, hook, adhesive or other means of being attached to something. Thus, MWIDs could be attached to key chains, computer systems, telephone equipment, car dashboards, and other locations from which a user can be easily and quickly notified that a communication is awaiting him or her. Illustratively, adhesive (e.g., regular or double-backed tape, non-permanent glue) may be placed on the back of the MWID to allow for easy and/or removable attachment to a wall, telephone, other device, furniture, etc.

Figure 3:
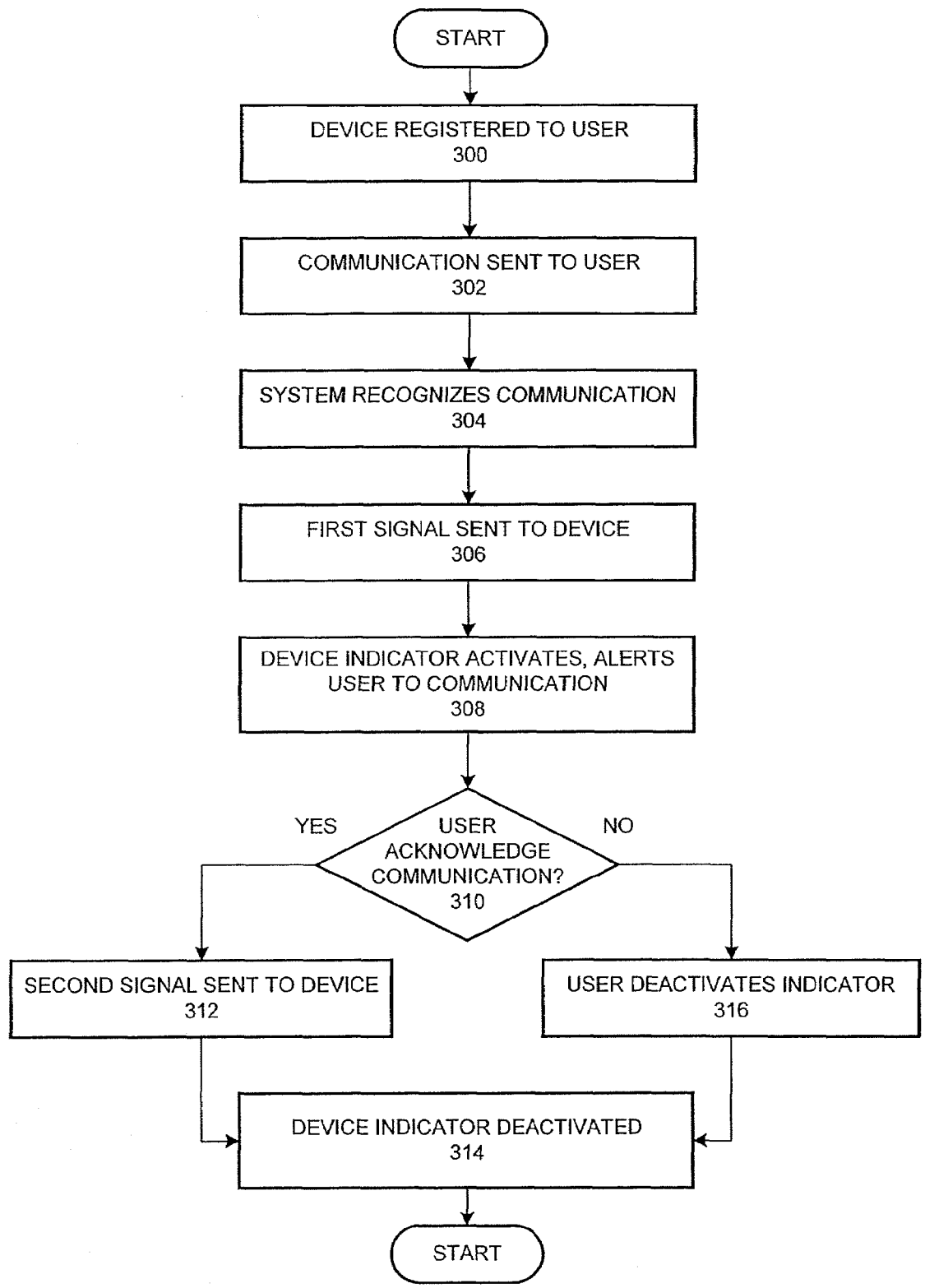
FIG. 3 is a flowchart illustrating one method of employing the message-waiting indicator of FIG. 2 in accordance with an embodiment of the invention.

FIG. 3 demonstrates one method of notifying a user of a communication with a message waiting indication device such as MWID 200 of FIG. 2. Other methods of employing a MWID may be derived from FIG. 3 and the accompanying discussion.

In state 300 of FIG. 3, a user registers a MWID. The MWID may, for example, be provided by the organization providing voice-mail service or an Internet service to the user. The user may, upon receipt of the MWID, access a web site of the organization to register and configure the MWID or may do so telephonically.

Illustratively, registration of a MWID may entail associating the MWID (e.g., by serial number) with the user and indicating when it should be activated. Thus, the user may indicate that he or she wishes to register the device for use with a certain telephone number (e.g., for voice-mail messages left for the user at that number) or multiple telephone numbers. Thus, one MWID may be employed to indicate receipt of a voice-mail message at any of several telephone numbers. Conversely, multiple MWIDs may be associated with a single telephone number, in which case each may be configured differently or they may be configured identically.

The user may specify that he or she is to be alerted (i.e., the MWID activated) for every voice-mail message left for him or her, for every message from a particular person, telephone number or collection of telephone numbers.

The user may specify that he or she is only to be alerted for certain types (e.g., voice-mail messages, electronic mail messages), lengths or priorities of messages, etc. In summary, each MWID may be registered and configured separately to alert a user to different communication statuses. Users may also be able to de-register a MWID.

If the user's MWID is capable of multiple indication patterns (e.g., different LED flashing intervals or sequences), the user may also specify which pattern is to be used for different types of communications, different communication priorities, different numbers of communications and other criteria.

In state 302 a communication is sent to the user. The communication may be a voice-mail message, an electronic mail message, a facsimile, a page, etc.

In state 304, the organization tasked with managing notifications to the user via his or her MWID recognizes that the communication is waiting. Illustratively, this organization may also operate the system on which the communication was received, in which case states 302 and 304 may be performed substantially simultaneously. Otherwise, the organization is notified of the communication or checks the user's voice-mail box or electronic mail box or other communication repository on a periodic basis to determine if any communications await the user's attention.

In state 306, the organization initiates a first signal to the user's MWID. Illustratively, this may simply comprise an empty paging signal or other simple wireless signal.

In response to the first signal, in state 308 an indicator on or in the user's MWID alerts the user that he or she has one or more communications waiting. The manner in which the indicator flashes, beeps, vibrates or otherwise signals the user may indicate the type, source, size, number, priority or other characteristic of the communication.

If, in state 310, the user retrieves his or her communication(s), then in state 312 a second signal, possibly different from the first signal, is sent to the MWID. In response to this, in state 314 the MWID indicator is deactivated.

Otherwise, in one embodiment of the invention, in state 316 the user may manually deactivate the MWID indicator. This may be done, for example, by manipulating a sensor, switch, button or other portion of the MWID provided for this purpose. As with the second signal, manipulation of such a switch will cause the indicator to be deactivated in state 314.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

For example, the wireless signals used to activate and deactivate a message waiting indication device (MWID) in an embodiment of the invention may be of various types or within various frequency bands. In one implementation radio paging may be employed, in which case the receiver included in the MWID is a radio-paging receiver. In this implementation, one radio paging signal or ping could be used to activate the MWID indicator, while a second signal, or two successive pings, could deactivate the indicator. This implementation may be particularly well suited for an environment in which an inexpensive device is desired that can operate on the power provided by a small battery. Further, signaling such a device requires little network utilization, thus keeping the cost of each signaling event low.

What is claimed is:

1. A system for indicating receipt of a communication, comprising:

means for associating one or more different types of communication with a first receiver and for associating said one or more different types of communication with a second receiver, which second types may overlap said first types;

first receiving means for receiving, by said first receiver, one or more signals, each signal associated with one of said first one or more different types of communications, in response to said first one or more different types of communication sent to a user;

first activating means for activating a first indicator, said first indicator associated with said first receiver, in response to receiving said one or more signals;

first deactivating means for deactivating said first indicator;

second receiving means for receiving, by said second receiver, one or more signals, each signal associated with one of said second one or more different types of communications, in response to said second one or more different types of communication sent to a user;

second activating means for activating a second indicator, said second indicator associated with said second receiver, in response to receiving said one or more signals; and second deactivating means for deactivating said second indicator.

2. The system of claim 1, wherein said means for associating said one or more different types of communication with said first receiver uses a first identification scheme of said first receiver and wherein said means for associating said one or more different types of communication with said second receiver uses a second identification scheme of said second receiver.

3. The system of claim 1, wherein said different types of communication comprise any of:
a telephone call;
a page;
an electronic mail message; and
a facsimile.

4. The system of claim 1, wherein said each signal transmits digital data streams along a network and wherein said each signal is any of:
electrical;
electromagnetic; and
optical.

5. The system of claim 1, wherein an indicator is any of:
light emitting diode (LED);
a vibrating alarm; and
audible alarm.

6. A method for indicating receipt of a communication, comprising the steps of:

associating a first set of one or more different types of communication with a first receiver and associating a second set of one or more different types of communication with a second receiver;

said first receiver receiving one or more first signals, each signal associated with one of said first set of one or more different types of communications, in response to said first set of one or more different types of communication sent to a user;

activating a first indicator, said first indicator associated with said first receiver, in response to receiving said one or more first signals;

deactivating said first indicator;

said second receiver receiving one or more signals, each signal associated with one of said second set of one or more different types of communications, in response to said second set of one or more different types of communication sent to a user;

activating a second indicator, said second indicator associated with said second receiver, in response to receiving said one or more signals; and deactivating said second indicator.

7. The method of claim 6, wherein said associating said first set of one or more different types of communication with said first receiver uses a first identification scheme for said first receiver and wherein said associating said second set of one or more different types of communication with said second receiver uses a second identification scheme for said second receiver.

8. The method of claim 6, wherein said different types of communication comprise any of:
a telephone call;
a page;
an electronic mail message; and
a facsimile.

9. The method of claim 6, wherein said each signal transmits digital data streams along a network and wherein said each signal is any of:
electrical;
electromagnetic; and
optical.

10. The method of claim 6, wherein an indicator is any of:
light emitting diode (LED);
a vibrating alarm; and
audible alarm.

11. A system for indicating receipt of a message, comprising:

a message from one or more types of communication available to and of some interest to a user;

a first selection scheme and first detection means for detecting and filtering said message according to said first selection scheme, and first sending means to send information about a message selected by said first detection means;

a second selection scheme different from said first selection scheme, and second detection means for detecting and filtering said message according to said second selection scheme, said second detection means different from said first detection means, and second sending means to send information about a message selected by said second detection means;

a first receiver for receiving information from said first detection means through said first sending means, said first receiver associated with first indicator means;

a second receiver for receiving information from said second detection means through said second sending means, said second receiver associated with second indicator means;

wherein said user can receive indications about a message selected by said first selection scheme through a first receiver and indicator and can receive separate indications about a message selected by said second selection scheme through a second receiver and indicator.

12. The system of claim 11 further comprising:
means for associating said first sending means with said first receiver and
means for associating said second sending means with said second receiver.

13. The system of claim 11 further comprising:
means for associating said first sending means with said first receiver through an identification scheme associated with said first receiver, and means for associating said second sending means with said second receiver through an identification scheme associated with said second receiver.

14. The system of claim 11, wherein said different types of communication comprise any of:
   a telephone call to any of one or more selected phone numbers;
   a page to any of one or more selected pager numbers;
   an electronic mail message to any of one or more selected electronic mail addresses; and
   a facsimile to any of one or more selected facsimile numbers.

15. The system of claim 11, wherein an indicator is any of:
   light emitting diode (LED);
   a vibrating alarm; and
   audible alarm.

16. The system of claim 15, wherein the indicator can present a variety of responses according to said first or second selection scheme and can present a first or a second or another indication.

17. The system of claim 11, wherein said first or second or another indication can be any of:
   a first lighting color;
   a second lighting color;
   another lighting color;
   a first light blinking pattern;
   a second light blinking pattern;
   another light blinking pattern;
   a first vibrating alarm pattern or sequence;
   a second vibrating alarm pattern or sequence;
   another vibrating alarm pattern or sequence;
   a first audible alarm tone;
   a second audible alarm tone;
   another audible alarm tone;
   a first audible alarm repeat pattern;
   a second audible alarm repeat pattern; and
   another audible alarm repeat pattern.

\* \* \* \* \*